(12) United States Patent
Rourk

(10) Patent No.: US 6,750,458 B1
(45) Date of Patent: Jun. 15, 2004

(54) SYSTEM AND METHOD FOR DETECTING RADIOACTIVE CONTAMINATION

(76) Inventor: Christopher John Rourk, 4507 Bretton Bay La., Dallas, TX (US) 75287

( * ) Notice: Subject to any disclaimer, the term of this patent is extended or adjusted under 35 U.S.C. 154(b) by 0 days.

(21) Appl. No.: 10/356,956

(22) Filed: Feb. 3, 2003

Related U.S. Application Data

(60) Provisional application No. 60/420,388, filed on Oct. 22, 2002.

(51) Int. Cl.[7] ............................................... G01T 1/02
(52) U.S. Cl. ................................................ 250/474.1
(58) Field of Search ........................................ 250/474.1

(56) References Cited

U.S. PATENT DOCUMENTS

| | | | | |
|---|---|---|---|---|
| 2,680,816 A | * | 6/1954 | Stern ........................ | 250/482.1 |
| 5,051,597 A | * | 9/1991 | Lewis et al. ................ | 250/474.1 |
| 5,206,118 A | * | 4/1993 | Sidney et al. ............... | 430/343 |
| 5,635,403 A | * | 6/1997 | Bailey ....................... | 436/66 |
| 6,232,610 B1 | * | 5/2001 | Pageau et al. ............. | 250/474.1 |

OTHER PUBLICATIONS

Web page from International Speciality Products website, http://www.ispoorp.com/products/dosimetry/content/products/type_r/conspefo.html, 3 pages, Oct. 6, 2003.

\* cited by examiner

*Primary Examiner*—Constantine Hannaher
*Assistant Examiner*—Shun Lee

(57) ABSTRACT

A method for detecting radioactive contamination is provided. The method includes placing a radiochromic material on a surface. It is then determined whether spotting of the radiochromic material has occurred. If spotting of the radiochromic material has occurred, it is determined that radioactive contamination has been detected.

18 Claims, 2 Drawing Sheets

SYSTEM AND METHOD FOR DETECTING RADIOACTIVE CONTAMINATION

RELATED APPLICATIONS

The present application claims priority to U.S. Provisional Application Ser. No. 60/420,388, filed Oct. 22, 2002, entitled "System and Method for Detecting Radioactive Contamination," which is hereby incorporated by reference for all purposes.

FIELD OF THE INVENTION

The present invention pertains to the field of radiation detection, and more particularly to a system and method for detecting radioactive contamination that uses radiochromic materials.

BACKGROUND

Radiation dosimetry usually involves systems and processes that determine accurate dose exposures to alpha, beta, and gamma radiation. Such dosimeters include personal dosimeters that are used to determine dose exposures in the range of several hundred roentgen-equivalent man (REM). Levels of exposure over several hundred REM for a whole body dose can be fatal, so dosimeters measuring in excess of several hundred REM are not usually considered suitable for use in personal dosimetry. While such high-dose dosimeters can be less expensive, more expensive low-dose dosimeters that cost over $100 each are typically used.

SUMMARY OF THE INVENTION

In accordance with the present invention, a system and method for are provided for detecting radioactive contamination that overcome known problems with detecting radioactive contamination.

In particular, a system and method for detecting radioactive contamination are provided that use radiochromic materials that can be easily surveyed with the unaided human eye to determine whether radioactive contamination is present.

In accordance with an exemplary embodiment of the present invention, a method for detecting radioactive contamination is provided. The method includes placing a radiochromic material on a surface. It is then determined whether spotting of the radiochromic material has occurred. If spotting of the radiochromic material has occurred, it is determined that radioactive contamination has been detected.

The present invention provides many important technical advantages. One important technical advantage of the present invention is a system and method for detecting radioactive contamination that can detect low dose rate contamination using dosimetry equipment that is very inexpensive and easy to operate. The present invention uses radiochromic dosimeters or other dosimeters that are generally unsuitable for detecting low doses to detect particulate radioactive material that has been deposited on a surface, as such granulated radionucleides, as such particulates cause high dose rate exposure to a small area that is sufficient to cause such radiochromic dosimeters to change color.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
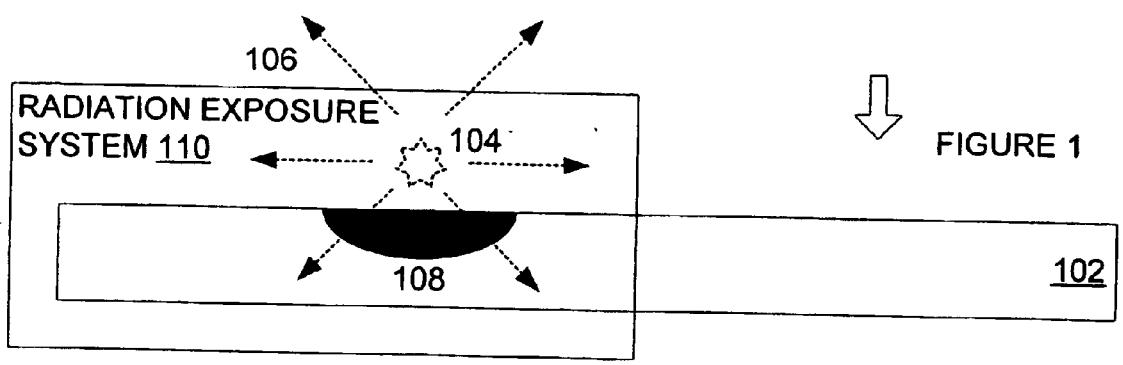
FIG. 1 is a diagram of a system for detecting radioactive contamination in accordance with an exemplary embodiment of the present invention.
Figure 1:
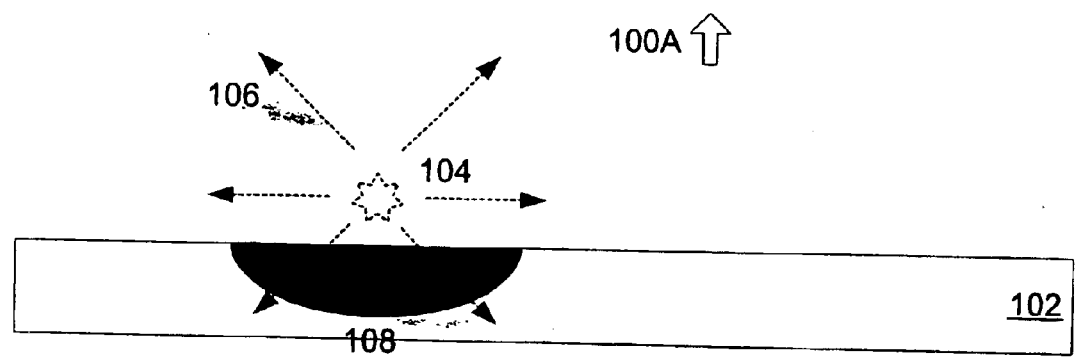
Figure 1:
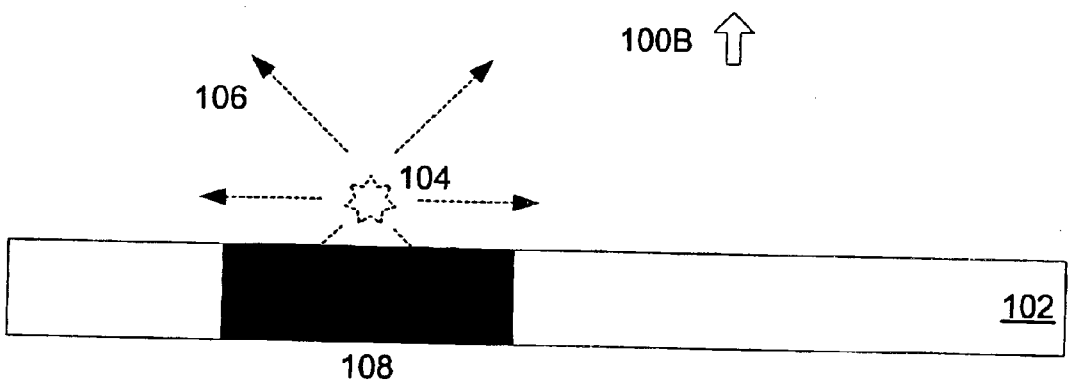
Figure 1:
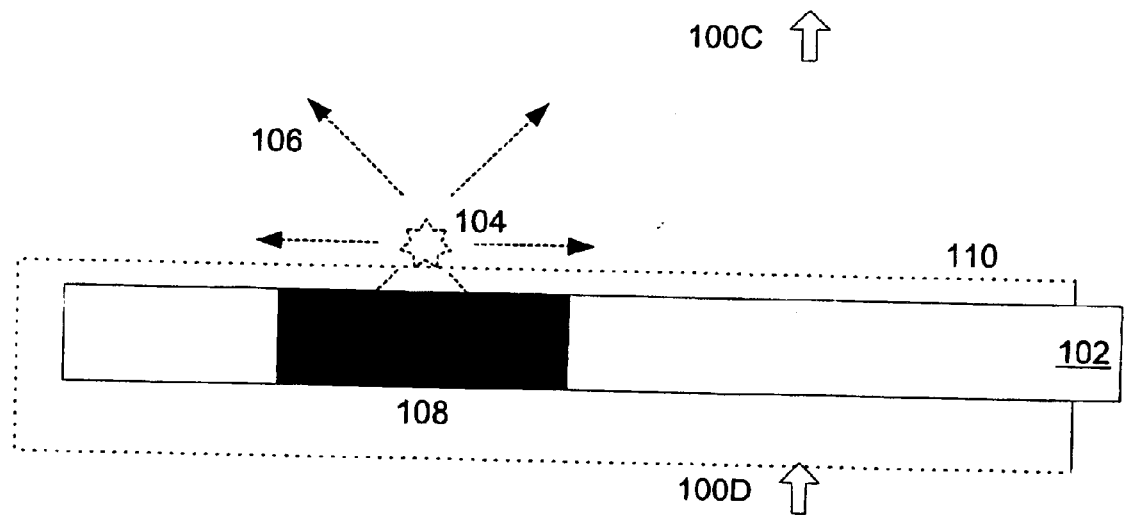

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of systems 100A through 100C for detecting radioactive contamination in accordance with an exemplary embodiment of the present invention. System 100A uses radiochromic material 102 to determine whether a radioactive particle 104 that emits radiation 106 is present. Radiochromic material 102 is generally a clear material that undergoes a color change when the material is exposed to radiation 106. Radiation 106 can be alpha, beta, gamma, or other forms of radiation. Radiochromic material 102 is typically matched to the expected type of radiation that will be present, but can be a suitable radiochromic material when it is not known in advance what kind of radiation will be present. In this exemplary embodiment, radiochromic material 102 can be a selection of different radiochromic materials that are responsive to alpha, beta, and gamma radiation (including different materials in different places), can be a single material that is responsive to multiple types of radiation, or can be other suitable radiochromic or inexpensive high dose dosimeter materials.

If radiochromic material 102 is exposed to a uniform radiation field, radiochromic material 102 will undergo a uniform color change, thus becoming more opaque and typically more opaque to radiation of a specific wavelength. If radiochromic material 102 is exposed to particulate radiation sources, though, spotting of the radiochromic material 102 can occur in the manner described herein.

The radioactive particles can include milled or ground particles of cobalt 60, cesium 137, or other elements that emit radiation as they break down into more stable elements, as well as salts or other compounds formed by such elements that are treated to be amenable to atmospheric dispersion. If such milled or ground particles or particulate compounds are released into the atmosphere, they will disperse and eventually settle on surfaces. Radiochromic material 102 is disposed on such surfaces in order to allow such contamination to be detected. If radiochromic material 102 includes different radiochromic materials that are responsive to different types of radiation, these different materials can be randomly or otherwise distributed on surfaces, in order to improve the chance of detecting particulate contamination of unknown origin or type. Likewise, radiochromic material 102 can be responsive to multiple types of radiation, or can be a composite of materials that are responsive to multiple types of radiation.

After radioactive particle 104 has been present for a period of time, radiochromic material 102 will begin to undergo a color change due to the exposure of color-changing materials in the radiochromic material to the energy of the radiation. The amount of radiation exposure will be a function of the specific reactivity of the source material of the particle, the mass of the particle, the degree to which the radioactive material of the particle has decayed, and the distance between the particle and the radiochromic material. Thus, after an initial period of time, a color change zone 108 shown in system 100A will exist. This color change zone may be noticeable to an unaided human observer as a dot on otherwise clear radiochromic material 102.

Likewise, as additional time passes, color change zone 108 will spread, as shown in system 100B and 100C. After sufficient time, color change zone 108 will spread to a quasi-steady state, where the amount of radiation that is reaching the unexposed radiochromic material 102 is too weak to cause the color to change in a manner that will cause color change zone 108 to spread by more than a small amount over a period of time.

System 100D include adhesive cover 110 for radiochromic material 102 that is used to secure radioactive particle 104 in the same location, so that periodic checks of radiochromic material 102 will not disrupt the exposure of radiochromic material 102 to radiation emitted by particle 102, thus allowing more frequent checks. Adhesive cover 110 can be a suitable adhesive material, can cover one or both surfaces or portions thereof of radiochromic material 102 where suitable, including a clear, two-sided adhesive material that sticks to radiochromic material 102 on one side and which exposes the other adhesive side to the atmosphere, to aid in trapping and holding radioactive particles. Likewise, adhesive cover 110 can be a backing material that improves visibility, such as a white backing material or a backing material having a color that is selected based on the color that radiochromic material 102 turns after exposure. For example, when radiochromic material 102 turns red, the backing material of adhesive cover 110 can be yellow or blue. Likewise, other suitable combinations of colors can be selected, such as yellow backing for blue or red radiochromic material, green backing for red or orange, or other combinations that have been tested to determine where recognition is optimized.

Radiation exposure system 110 can receive color change zone 108 data, radioactive particle 104 data, and other suitable data, and can determine the radiation dose that has been received by radiochromic material 102. In one exemplary embodiment, radiation exposure system 110 can include a sensitive radiation dose rate meter and can determine the received dose from the radiation dose rate and the size and depth of penetration of the color change zone 108 on radiochromic material 102.

In operation, a user places radiochromic material 102 on surfaces that would be exposed to radioactive particulate contamination. For example, areas within enclosed spaces such as closets or desks would be less likely to receive deposited particulate contaminants from the atmosphere than areas on desks, countertops, on lawn furniture, on mail boxes, on parked automobiles, or on other suitable surfaces. In addition, no significant materials are placed on radiochromic material 102. In this regard, a significant material would be one that blocks a significant amount of radioactive material. Thus, for gamma radiation, thin layers of wood or other materials could be placed over radiochromic material 102, whereas for beta or gamma radiation, even layers of cardboard or paper could shield the radiochromic material from the radiation. If multiple types of radiochromic materials are used, then multiple types of protection can likewise be utilized. For example, gamma-sensitive materials might also be sensitive to ultraviolet light, such that shielding of such materials with cardboard is desirable. Alternatively, alpha sensitive radiochromic materials might be less sensitive to ultraviolet light, allowing them to be displayed without significant layers of shielding that might also block alpha particles.

Large fields of radiochromic material can also be disposed on the floors at nuclear power plants or other facilities where spills or leaks of radioactive materials could occur. In this manner, the presence of radioactive contamination both above and below the backing material can be readily detected. Likewise, the use of a colored backing can also improve the environment from a psychological perspective.

A user periodically inspects radiochromic material 102 to determine whether spotting has occurred, such as by holding radiochromic material 102 up to a light source and visually confirming whether spots have appeared on the radiochromic material. If no spots have appeared, and a statistically significant number of radiochromic materials 102 have been inspected, then the user can have some level of certainty that there is no particulate radioactive material present. Alternatively, if one or two spots are found, the user can request additional surveying with more sensitive equipment. If a large number of spots are found, the user should evacuate the premises and notify authorities. If uniform exposure is found, it should be determined whether an alternate source of radiation, such as ultraviolet light, has been used to illuminate the radiochromic material 102. If not, then additional inspection should be performed.

System 100A through 100C thus allow a user to perform an inexpensive go/no-go test to determine whether an area has been exposed to particulate radioactive contaminants. While additional examination of systems 100A through 100C can determine exposure time from the amount of spreading of color change zone 108, to the unaided observer systems 100a through 100C allow some indication of radioactive contamination to be provided, regardless of whether accumulated dose can not be readily determined. Systems 100A through 100C can thus be used to quickly determine whether an area has been exposed to particulate radioactive materials or is likely to be clear of such contamination, thus providing some peace of mind to users that may have concerns regarding the potential presence of radioactive contamination.

In another exemplary embodiment, a scintillation detector can be used to detect surface contamination. The scintillation detector can include a fluorescing compound such as an alkali halide salt, such as sodium iodide (NaI), cesium iodide (CsI), or other suitable scintillation detectors, with an 'activator' such as thallium, sodium or other suitable activators. Although scintillation detectors can detect lower levels of contamination, they are susceptible to reading "false positives," such as from background radiation. In addition, they must be viewed in the dark, which can create problems with viewing in-situ during daylight hours, and do not create a record of exposure to radioactive contamination.

Figure 2:
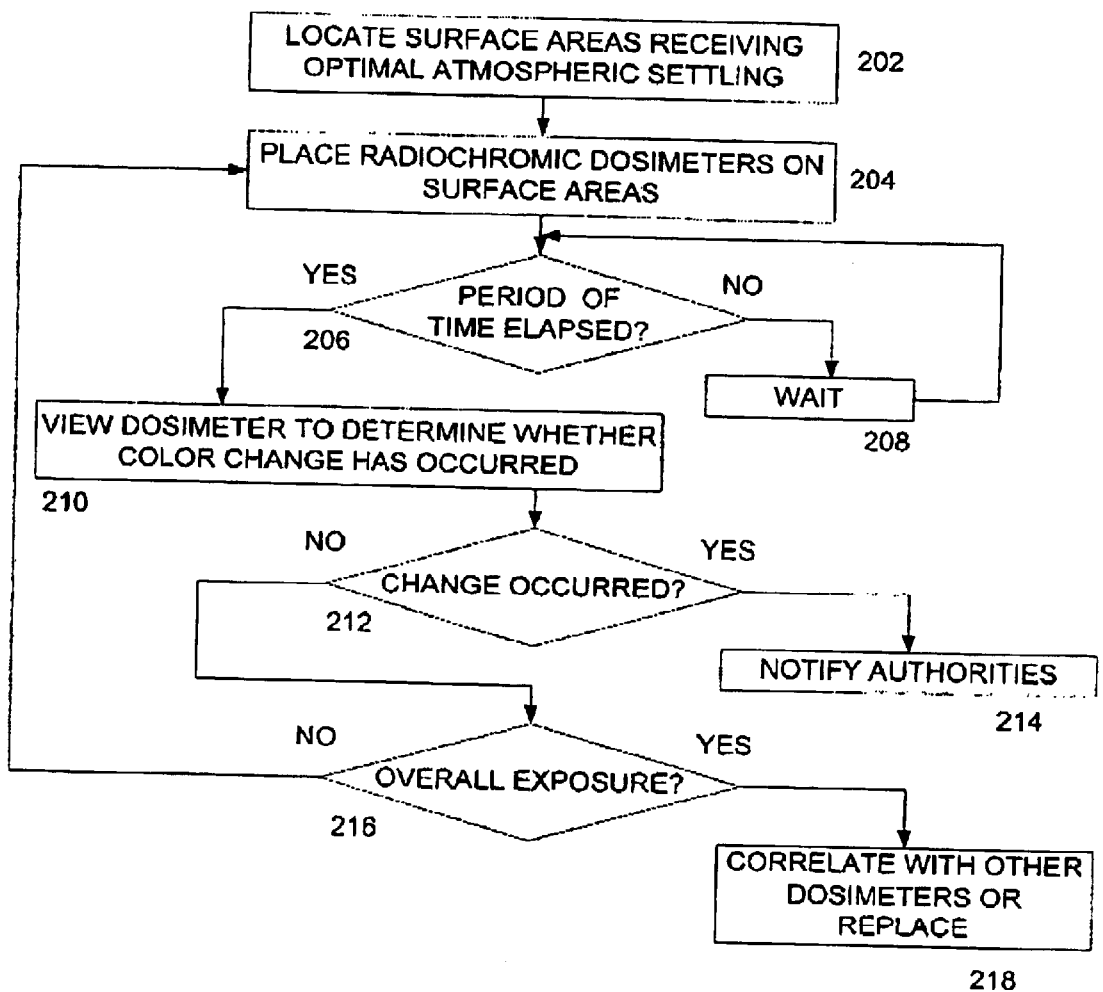
FIG. 2 is a diagram of a method for detecting radioactive contamination in accordance with an exemplary embodiment of the present invention.

FIG. 2 is a diagram of a method 200 for detecting radioactive contamination in accordance with an exemplary embodiment of the present invention. Method 200 begins at 202 where areas are that are most likely to receive surface contaminant settling of atmospherically dispersed particulates. For example, enclosed spaces are less likely to receive particulate settling, as well as areas in which particulate may be blown or washed away by wind or rain. Areas without such problems arc located at 202, and the method proceeds to 204.

At 204 radiochromic dosimeters arc placed on the selected surfaces. In one exemplary embodiment, an assortment of radiochromic dosimeters can be used, such as those for detecting alpha, beta, or gamma radiation or other suitable types of radiation. Likewise, only a single type of radiochromic dosimeter can be used, such as for gamma or another radiation type of particular interest, a radiochromic dosimeter can be used that detects multiple types of radiation, a radiochromic dosimeter requiring protection from ultraviolet radiation can be used, or other suitable processes can be used. In another exemplary embodiment, sheets of color-backed radiochromic material can be disposed on the floors and operating surfaces of a nuclear power plant, nuclear sub, food irradiation facility, or other suitable locations, and can be used to detect spills, leaks, or other types of contamination that would not result in a ready indication from an area radiation monitor. The method then proceeds to 206.

At 206 it is determined whether a predetermined period of time has elapsed. For example, if a radiochromic dosimeter is checked continuously, then any particulate contamination could be blown off or displaced and thus allow the contamination to go undetected. While an adhesive cover can be provided to minimize the potential detrimental affects from checking the dosimeter, it is nevertheless impractical to check the dosimeter continually. Thus, a period for checking should be determined, and the dosimeter should be allowed to potentially accumulate radioactive materials for a significant period of time prior to checking it again for exposure. The method then proceeds to 208 if it is determined that additional time is needed, otherwise, the method proceeds to 210.

At 210, the dosimeter is viewed to determine whether spotting has occurred. In one exemplary embodiment, the dosimeter is removed from a cover with an adhesive surface or is otherwise retrieved for viewing. Likewise, viewing with a device such as a color meter or other suitable equipment can be performed, during periodic walk-through inspections, or in other suitable manners. The method then proceeds to 212.

At 212 it is determined whether spotting has occurred. In one exemplary embodiment, spotting can be detected using image analysis, human observers, or other suitable processes, such as by holding the radiochromic dosimeter up to a colored background that will cause spotting to be highlighted. If spotting has occurred, the method proceeds to 214 and the authorities are notified. The authorities can then use more sensitive equipment to measure low dose rate, can evaluate the radiochromic material to determine estimated dose, or can perform or other suitable functions.

If no spotting is found the method proceeds to 216, where it is determined whether the overall exposure rate has been exceeded, such as may occur with UV radiation for certain types of radiochromic materials. If no overall exposure has occurred, the method returns to 204 for continued monitoring. If overall exposure is detected, the method proceeds to 218 and other dosimeters are checked, or it is otherwise determined whether it is necessary to receive more accurate assistance, replace dosimeters, or perform other suitable processes.

Although exemplary embodiments of a system and method for multiple image analysis have been described in detail herein, those killed in the art will also recognize that various substitutions an modifications can be made to the systems and methods without departing from the scope and spirit of the appended claims.

What is claimed is:

1. A radioactive contamination detector comprising:
   a layer of radiochromic material configured to collect contamination;
   a layer of opaque material adhered to the radiochromic material; and
   wherein the layer of opaque material adhered to the radiochromic material improves the ability of a human observer to determine when radioactive contamination is present, and the layer of radiochromic material is covered by adhesive material that holds surface contamination.

2. The detector of claim 1 wherein the layer of opaque material adhered to the radiochromic material is a colored material that increases the visibility of color changes to the radiochromic material.

3. The detector of claim 1 wherein the layer of opaque material adhered to the radiochromic material is a white material that increases the visibility of color changes to the radiochromic material.

4. The detector of claim 1 wherein the layer of opaque material adhered to the radiochromic material is a colored material that increases the visibility of color changes to the radiochromic material, wherein the color is selected based on the color that the radiochromic material changes to when exposed to radiation.

5. The detector of claim 1 wherein the layer of radiochromic material is configured to collect contamination by placement in an area where contamination is likely to accumulate.

6. The detector of claim 1 wherein the radiochromic material improves the ability of a human observer to determine when radioactive contamination is present by determining whether spotting of the radiochromic material is present.

7. A method for detecting radioactive contamination comprising:
   providing a backing of opaque material to a layer of radiochromic material;
   disposing the backed radiochromic material on a surface so as to collect surface contamination; and
   determining whether radioactive contamination is present on the surface by human observation.

8. The method of claim 7 further comprising providing an adhesive material on the surface of the hacked radiochromic material so as to improve the ability of the radiochromic material to hold contamination.

9. The method of claim 7 wherein providing the backing of opaque material to the layer of radiochromic material comprises providing a white opaque material.

10. The method of claim 7 wherein providing the backing of opaque material to the layer of radiochromic material comprises providing a colored opaque material.

11. The method of claim 7 wherein providing the backing of opaque material to the layer of radiochromic material comprises providing a colored opaque material that is selected to improve the visibility of color changes in the radiochromic material.

12. The method of claim 7 wherein determining whether radioactive contamination is present on the surface by human observation comprises determining whether a plurality of spots are visible.

13. A radioactive contamination detector comprising:
   a layer or radiochromic material; and
   a layer of material adhered to the radiochromic material, the layer of material selected to allow spotting of the radiochromic material to be detectable by a human observer and further comprising an adhesive layer disposed on a the surface of the radiochromic material.

14. The detector of claim 13 wherein the layer of material adhered to the radiochromic material comprises an opaque material.

15. The detector of claim 13 wherein the layer of material adhered to the radiochromic material comprises an opaque white material.

16. The detector of claim 13 wherein the layer of material adhered to the radiochromic material comprises an opaque colored material.

17. The detector of claim 13 wherein the radiochromic material comprises a film.

18. The detector of claim 13 wherein the radiochromic material comprises a film containing a radiochromic dye.

* * * * *